(12) United States Patent
Sudou

(10) Patent No.: US 9,070,065 B2
(45) Date of Patent: Jun. 30, 2015

(54) IC CARD, PORTABLE ELECTRONIC APPARATUS, AND CONTROLLING METHOD OF IC CARD

(71) Applicant: KABUSHIKI KAISHA TOSHIBA, Tokyo (JP)

(72) Inventor: Kiyohito Sudou, Tachikawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 175 days.

(21) Appl. No.: 13/798,892

(22) Filed: Mar. 13, 2013

(65) Prior Publication Data
US 2014/0034737 A1 Feb. 6, 2014

(30) Foreign Application Priority Data

Aug. 1, 2012 (JP) ................................. 2012-171218

(51) Int. Cl.
| | | |
|---|---|---|
| *G06K 19/06* | (2006.01) | |
| *G06K 19/07* | (2006.01) | |
| *G06K 7/10* | (2006.01) | |

(52) U.S. Cl.
CPC ........ *G06K 19/0723* (2013.01); *G06K 7/10237* (2013.01)

(58) Field of Classification Search
CPC ....................... G06K 19/0723; G06K 7/10237
USPC .................................................. 235/380, 492
See application file for complete search history.

(56) References Cited

U.S. PATENT DOCUMENTS

| | | | | |
|---|---|---|---|---|
| 5,774,876 | A  * | 6/1998 | Woolley et al. ................. 705/28 |
| 6,577,229 | B1 * | 6/2003 | Bonneau et al. ........... 340/10.41 |
| 7,350,706 | B2 * | 4/2008 | Morita .......................... 235/451 |
| 7,541,930 | B2 * | 6/2009 | Saarisalo et al. ........... 340/572.7 |
| 8,362,877 | B2 * | 1/2013 | Bauchot et al. ................ 340/8.1 |
| 8,417,184 | B2 * | 4/2013 | Takayama et al. ........... 455/41.1 |
| 2010/0001843 | A1 * | 1/2010 | Bae et al. ..................... 340/10.2 |

FOREIGN PATENT DOCUMENTS

JP        2011-118640 A      6/2011

* cited by examiner

*Primary Examiner* — Seung Lee
(74) *Attorney, Agent, or Firm* — Posz Law Group, PLC

(57) ABSTRACT

According to one embodiment, an IC card which makes a non-contact communication with an external apparatus, includes, a reception module configured to receive a first command transmitted from the external apparatus, a determination module configured to determine whether or not the first command is a switching request command which requests to switch the IC card from a passive mode to an active mode, a command generation module configured to generate a second command which controls other IC card to execute processing when the first command is the switching request command, a command transmission module configured to transmit the second command to the other IC card.

8 Claims, 7 Drawing Sheets

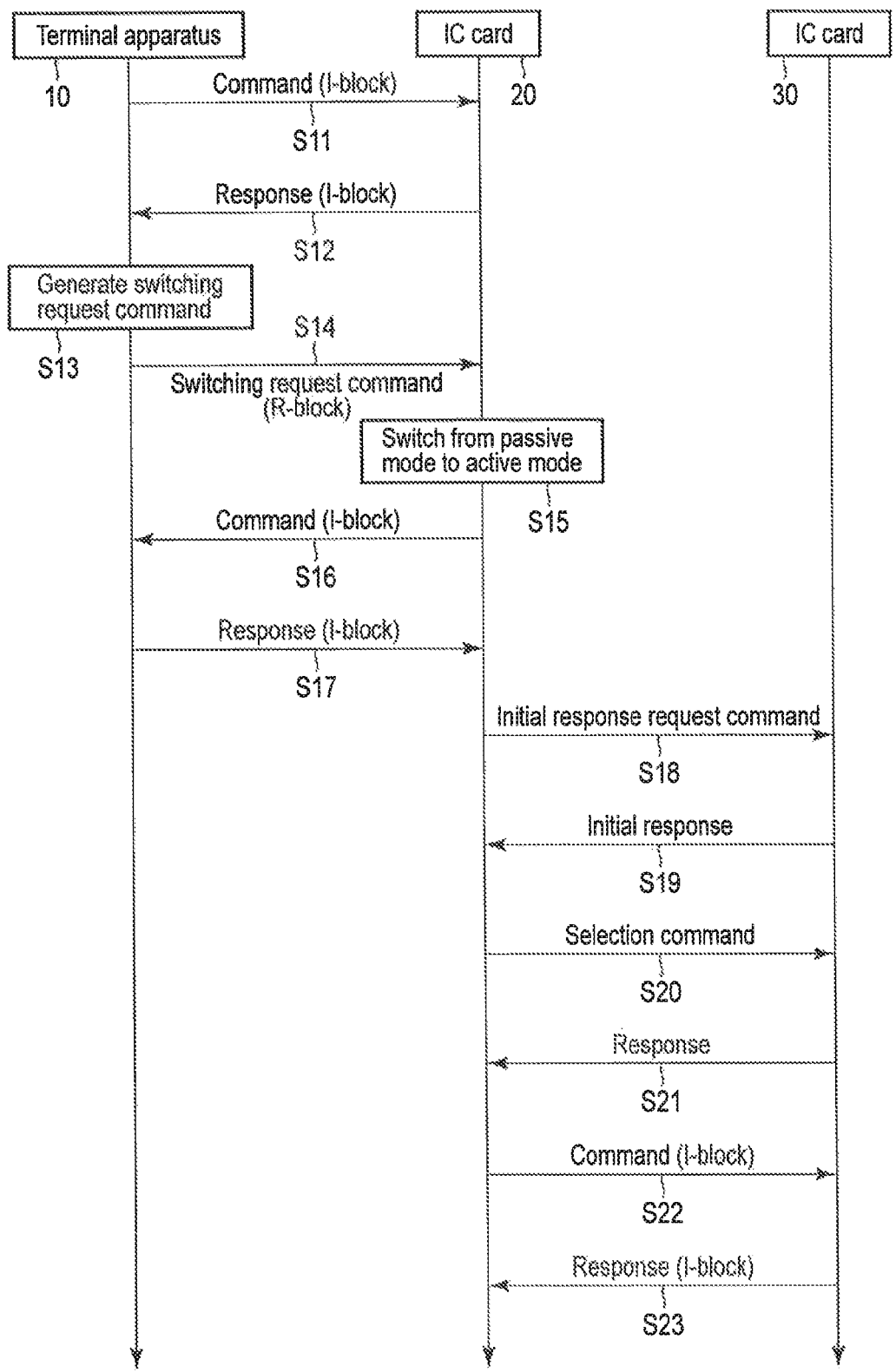
F I G. 3

IC CARD, PORTABLE ELECTRONIC APPARATUS, AND CONTROLLING METHOD OF IC CARD

CROSS-REFERENCE TO RELATED APPLICATIONS

This application is based upon and claims the benefit of priority from Japanese Patent Application No. 2012-171218, filed Aug. 1, 2012, the entire contents of which are incorporated herein by reference.

FIELD

Embodiments described herein relate generally to an IC card, a portable electronic apparatus, and a controlling method of an IC card.

BACKGROUND

In general, an IC card used as a portable electronic apparatus includes a card-shaped main body formed of a plastic material and the like, and an IC module embedded in the main body. The IC module includes an IC chip. The IC chip includes a nonvolatile memory such as an EEPROM (Electrically Erasable Programmable Read-Only Memory) or flash ROM, a CPU used to execute various calculations, a RAM memory used in processing of the CPU, and the like.

An IC card exchange data via non-contact communications. An IC card which makes such non-contact communications includes an IC chip and antenna. The IC card receives a magnetic field output from a reader/writer of an IC card processing apparatus, which processes the IC card, via the antenna in the card, and operates using an electromotive force by electromagnetic induction. When the IC card receives a command from the processing apparatus via non-contact communications, it executes an application according to the received command. Thus, the IC card can implement various functions.

Conventionally, the IC card processing apparatus functions in an active mode in which it transmits a command to the IC card. Also, the IC card functions in a passive mode in which it executes processing according to the received command. However, in recent years, an IC card which functions in the active mode is demanded.

BRIEF DESCRIPTION OF THE DRAWINGS

FIG. 3 is an exemplary view for explaining the IC card according to the embodiment.

DETAILED DESCRIPTION

In general, according to one embodiment, an IC card which makes a non-contact communication with an external apparatus, comprises, a reception module configured to receive a first command transmitted from the external apparatus, a determination module configured to determine whether or not the first command is a switching request command which requests to switch the IC card from a passive mode to an active mode, a command generation module configured to generate a second command which controls other IC card to execute processing when the first command is the switching request command, and a command transmission module configured to transmit the second command to the other IC card.

An IC card, a portable electronic apparatus, and a controlling method of an IC card will be described in detail hereinafter with reference to the drawings.

A portable electronic apparatus (IC card) 20 according to this embodiment and a processing apparatus (terminal apparatus) 10 which processes the IC card include, for example, a non-contact communication function. With this function, the IC card 20 and terminal apparatus 10 can exchange data with each other.

Figure 1:
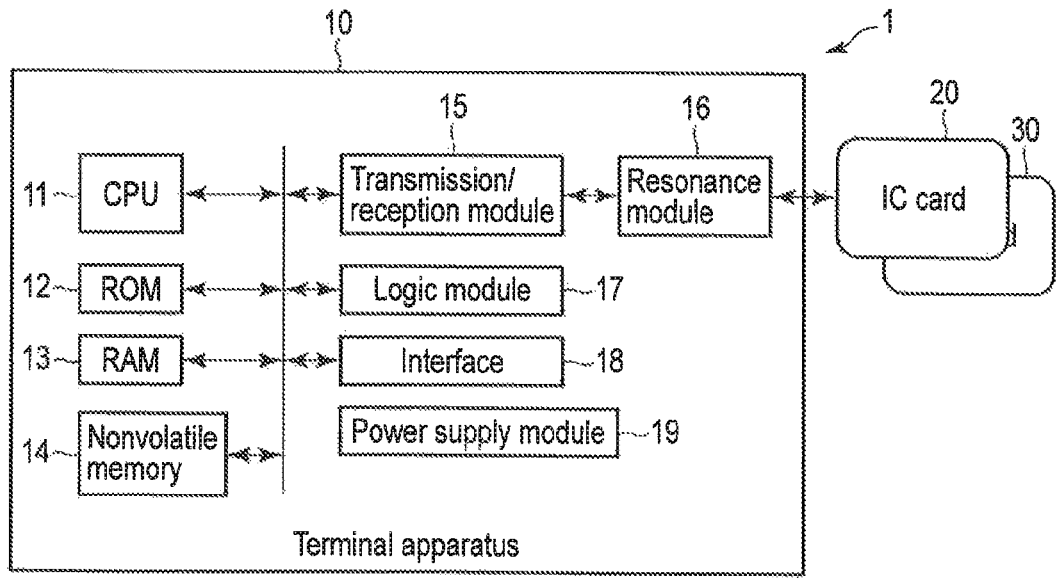
FIG. 1 is an exemplary view for explaining an IC card processing system according to an embodiment.

FIG. 1 shows an example of the arrangement of an IC card processing system 1 according to one embodiment.

The IC card system 1 includes the terminal apparatus 10 which processes the IC card 20, the IC card 20, an IC card 30, and the like. Note that the terminal apparatus 10 and IC card 20 can exchange various data with each other via non-contact communications, as described above. Also, the terminal apparatus 10 and IC card 30 can exchange various data with each other via non-contact communications. Note that the IC cards 20 and 30 have the same arrangement.

The terminal apparatus 10 includes a CPU 11, ROM 12, RAM 13, nonvolatile memory 14, transmission/reception module 15, resonance module 16, logic module 17, interface 18, and power supply module 19. The CPU 11, ROM 12, RAM 13, nonvolatile memory 14, transmission/reception module 15, resonance module 16, logic module 17, and interface 18 are connected to each other via a bus.

The CPU 11 functions as a control module which controls the overall terminal apparatus 10. The CPU 11 executes various kinds of processing based on control programs and control data stored in the ROM 12 or nonvolatile memory 14. For example, the CPU 11 exchanges commands and responses with the IC card 20 via the transmission/reception module 15 and resonance module 16.

The ROM 12 is a nonvolatile memory which pre-stores control programs, control data, and the like. The RAM 13 is a volatile memory which serves as a working memory. The RAM 13 temporarily stores data which is being processed by the CPU 11, and the like. For example, the RAM 13 temporarily stores data to be exchanged with an external apparatus via the transmission/reception module 15 and resonance module 16. Also, the PRA 13 temporarily stores programs to be executed by the CPU 11.

The nonvolatile memory 14 includes, for example, a flash memory such as an EEPROM. The nonvolatile memory 14 stores, for example, control programs, control data, applications, data used for the applications, and the like.

The transmission/reception module 15 and resonance module 16 configure an interface device required to communicate with the IC card 20.

The transmission/reception module 15 applies signal processing to data to be exchanged by the resonance module 16. For example, the transmission/reception module 15 encodes, decodes, modulates, and demodulates data. The transmission/reception module 15 supplies encoded and modulated data to the resonance module 16.

The resonance module 16 has, for example, an antenna having a predetermined resonance frequency. The resonance module 16 generates a magnetic field according to data supplied from the transmission/reception module 15. Thus, the terminal apparatus 10 can transmit data to the IC card 20, which is located within a communication range, in a non-contact manner.

Also, the resonance module 16 detects a magnetic field, and generates data according to the detected magnetic field. Thus, the resonance module 16 can receive data in a non-contact manner. The resonance module 16 supplies the received data to the transmission/reception module 15. The transmission/reception module 15 demodulates and decodes the data received from the resonance module 16. Then, the terminal apparatus 10 can acquire original data transmitted from the IC card 20.

The logic module 17 executes predetermined calculation processing. For example, the logic module 17 executes calculation processing such as encryption/decryption of data and random number generation under the control of the CPU 11.

The interface 18 is an interface required to communicate with various apparatuses, terminals, or the like. For example, to the interface 18, a keyboard, a display module, a host terminal such as another terminal, or the like is connected. The keyboard includes operation keys and the like used to generate operation signals based on inputs by an operator. The display module displays various kinds of information. The interface 18 receives data from the keyboard, and transfers it to the CPU 11. For example, when the user makes various operations on the keyboard, the terminal apparatus 10 can acquire operation signals from the user.

The power supply module 19 supplies electric power to the respective modules in the terminal apparatus 10.

Figure 2:
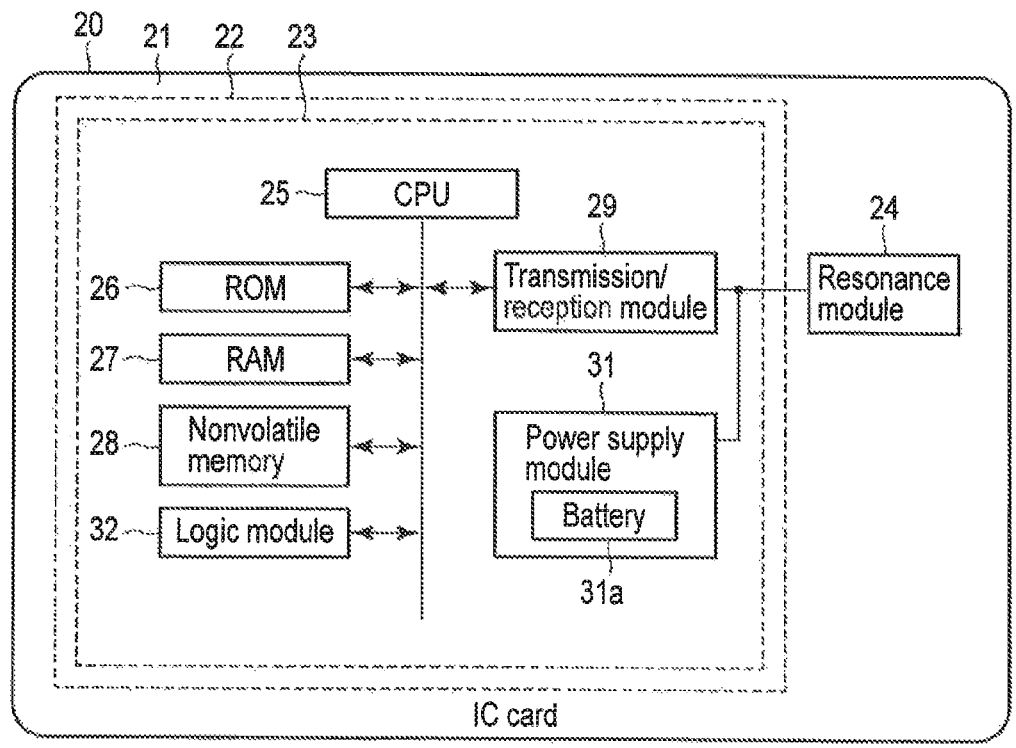
FIG. 2 is an exemplary view for explaining an IC card according to an embodiment.

FIG. 2 shows an example of the arrangement of the IC card 20 according to the embodiment.

As shown in FIG. 2, the IC card 20 includes, for example, a rectangular main body 21, and an IC module 22 and an antenna resonance circuit (resonance module) 24, which are incorporated in the main body 21. The IC module 22 includes an IC chip 23. When the IC module 22 is set in the main body 21, the resonance module 24 set in the main body 21, and the IC chip 23 of the IC module 22 are connected.

Note that the shape of the main body 21 is not limited to a rectangular shape but it may be an arbitrary shape as long as it allows to set at least the IC module 22 including the resonance module 24.

The IC chip 23 includes a CPU 25, ROM 26, RAM 27, nonvolatile memory 28, transmission/reception module 29, power supply module 31, logic module 32, and the like. The CPU 25, ROM 26, RAM 27, nonvolatile memory 28, transmission/reception module 29, and logic module 32 are connected to each other via a bus.

The resonance module 24 is an interface required to communicate with the resonance module 16 of the terminal apparatus (external apparatus) 10. The resonance module 24 includes, for example, an antenna which is formed of a metal line arranged in the IC module 22 to have a predetermined shape.

The IC card 20 generates a magnetic field from an antenna according to data to be transmitted to the terminal apparatus 10. Thus, the IC card 20 can transmit data to the terminal apparatus 10. Also, the IC card 20 recognizes data transmitted from the terminal apparatus 10 based on an induction current generated in the antenna by electromagnetic induction.

The CPU 25 functions as a control module which controls the overall IC card 20. The CPU 25 executes various kinds of processing based on control programs and control data stored in the ROM 26 or nonvolatile memory 28. For example, the CPU 25 executes various kinds of processing according to commands received from the terminal apparatus 10, and generates data such as responses as processing results.

The ROM 26 is a nonvolatile memory which pre-stores control programs, control data, and the like. The ROM 26 is incorporated in the IC card 20 in a state in which it stores control programs, control data, and the like in a manufacturing stage. That is, the control programs and control data stored in the ROM 26 are incorporated in advance according to the specification of the IC card 20.

The RAM 27 is a volatile memory which functions as a working memory. The RAM 27 temporarily stores data, which is being processed by the CPU 25, and the like. For example, the RAM 27 temporarily stores data received from the terminal apparatus 10 via the resonance module 24. Also, the RAM 27 temporarily stores data to be transmitted to the terminal apparatus 10 via the resonance module 24. Furthermore, the RAM 27 temporarily stores programs to be executed by the CPU 25.

The nonvolatile memory 28 includes, for example, a flash memory such as an EEPROM which allows to write and rewrite data. The nonvolatile memory 28 stores, for example, control programs, control data, applications, personal information, security information such as encryption keys, data used for the applications, and the like.

The transmission/reception module 29 applies signal processing such as encoding and load modulation to data to be transmitted to the terminal apparatus 10. For example, the transmission/reception module 29 modulates (amplifies) data to be transmitted to the terminal apparatus 10. The transmission/reception module 29 transmits data which has undergone the signal processing to the resonance module 24.

Also, the transmission/reception module 29 demodulates and decodes a signal received from the resonance module 24. For example, the transmission/reception module 29 analyzes a signal received from the resonance module 24. Thus, the transmission/reception module 29 acquires binary logic data. The transmission/reception module 29 transmits the analyzed data to the CPU 25 via the bus.

The power supply module 31 generates electric power based on electric waves (especially, carrier waves) transmitted from the resonance module 16 of the terminal apparatus 10. Furthermore, the power supply module 31 generates operation clocks. The power supply module 31 supplies the generated electric power and operation clocks to the respective modules in the IC card 20. The respective modules of the IC card 20 are operable when they receive power supply.

The power supply module 31 includes a battery 31a. The battery 31a includes, for example, a cell which extracts an electrical energy by chemical or physical reactions of materials. The battery 31a may include a capacitor or rechargeable battery which accumulates supplied electric power.

For example, the power supply module 31 can generate electric power based on carrier waves transmitted from the resonance module 16 of the terminal apparatus 10, and can charge the generated electric power in the battery 31a. Also, the power supply module 31 can supply electric power charged in the battery 31a to the resonance module 24. Thus, the IC card 20 can output carrier waves from the resonance module 24 using the electric power charged in the battery 31a.

The logic module 32 is a calculation module which executes calculation processing by hardware. For example, the logic module 32 executes processing such as encryption/decryption and random number generation based on commands from the terminal apparatus 10. For example, when a mutual authentication command is received from the terminal apparatus 10, the logic module 32 generates a random number, and transfers the generated random number to the CPU 25.

When the self apparatus is in the passive mode, the CPU 25 can control the transmission/reception module 29 to execute processing (command processing) according to a command received. The CPU 25 can execute processing according to various commands such as read/write commands specified by the ISO/IEC7816 according to commands received by the transmission/reception module 29.

Also, when the self apparatus is in the active mode, the CPU 25 can control the transmission/reception module 29 to transmit commands to the terminal apparatus 10 or another IC card 30. The CPU 25 analyzes responses transmitted from the terminal apparatus 10 or another IC card 30, and can recognize processing results in the terminal apparatus 10 or another IC card 30.

The IC card 20 is issued by primary issuance and secondary issuance. The terminal apparatus 10 creates files required to store various data in the nonvolatile memory 28 of the IC card 20 in the primary issuance. Thus, a Master File (MF), Dedicated File (DF), Elementary File (EF), and the like are created in the nonvolatile memory 28.

The MF is a file which forms the basis of a file structure. The DF is created under the MF. The DF is a file which groups and stores applets, components included in the applets, and the like. The EF is created under the DF. The EF is a file required to store various data. Also, the EF is located immediately under the MF.

The EF includes some types of files, that is, a Working Elementary File (WEF), Internal Elementary File (IEF), and the like. The WEE is a working EF, and stores personal information and the like. The IEF is an internal module EF, and stores, for example, an encryption key (personal identification number) required for security, and the like.

In the secondary issuance, for example, individual data such as customer data are stored in the EF. Thus, the IC card 20 is ready to be put into practical use. That is, the CPU 25 can implement various kinds of processing by executing programs stored in the nonvolatile memory 28 or ROM 26.

The terminal apparatus 10 transmits, for example, an initial response request command and selection command (to be collectively referred to as initial setting commands hereinafter) to the IC card 20, thereby making various settings associated with communications in the IC card 20.

The terminal apparatus 10 generates an initial response request command to be transmitted by the resonance module 16 so as to detect the IC card 20. The initial response request command has, for example, a parameter indicating that this command is an initial response request command, a parameter required to specify an application field, parameters indicating attribute information such as a type of command and an anti-collision method, a parameter indicating the number of anti-collision slots, a cyclic redundancy check code, and the like.

The terminal apparatus 10 repetitively transmits the generated initial response request command to the communication range by the resonance module 16. Also, the terminal apparatus 10 supplies carrier waves to the communication range.

When the IC card 20 enters the communication range of the resonance module 16 of the terminal apparatus 10, it is activated by carrier waves and is set in an idle state. That is, the terminal apparatus 10 supplies carrier waves to the IC card 20 within the communication range. Furthermore, the IC card 20 receives the initial response request command.

The CPU 25 of the IC card 20 analyzes the received initial response request command. Thus, the CPU 25 recognizes values of various parameters included in the initial response request command. The CPU 25 executes processing based on the recognized values of the parameters. The CPU 25 generates a response (initial response) to the initial response request command according to the processing result.

The initial response is generated to include a parameter indicating that this response is a response (initial response) to the initial response request command, a pseudo unique IC card (PICC) identifier, application data indicating applications written in the IC card 20, protocol information indicating protocols supported by the IC card 20, and a cyclic redundancy check code.

For example, upon reception of the initial response request command, the CPU 25 generates an initial response including the aforementioned information. Note that the protocol information includes information (communication rate information) indicating communication rates supported by the IC card 20. Furthermore, the protocol information includes communication rate information, a maximum frame length, a protocol type, a frame waiting time coefficient, application data encoding, a frame option, and the like.

The maximum frame length indicates that which can be received by the IC card 20. The protocol type indicates that supported by the IC card 20. The frame waiting time coefficient indicates a maximum time period from the end of a command (a frame including the command) transmitted from the terminal apparatus 10 until the IC card 20 begins to transmit a response. The application data encoding indicates an encoding format supported by the IC card 20. The frame option indicates whether the IC card 20 supports a node address (NAD) or card identifier (CID).

The IC card 20 transmits the generated response (initial response) to the initial response request command to the terminal apparatus 10 by the resonance module 24.

Upon reception of the response (initial response) to the initial response request command, the terminal apparatus 10 analyzes the received response. Thus, the terminal apparatus 10 recognizes that the IC card 20 exists within the self communication range.

Also, the terminal apparatus 10 recognizes the communication rate information included in the response, and recognizes the communication rates supported by the IC card 20. Furthermore, the terminal apparatus 10 generates a selection command including information indicating a communication rate to be set by the IC card 20, and identification information required to specify the IC card 20. The terminal apparatus 10 transmits the selection command to the IC card 20.

Upon reception of the selection command, the CPU 25 of the IC card 20 analyzes the selection command. Thus, the IC card 20 recognizes the communication rate and identification information which are included in the selection command and are designated by the terminal apparatus 10.

The IC card 20 compares the recognized identification information with that held by itself. When the two pieces of identification information match, the IC card 20 executes subsequent processing. In this case, the IC card 20 sets the communication rate designated by the selection command in itself. More specifically, the CPU 25 of the IC card 20 stores communication rate setting information indicating the communication rate designated by the selection command in a predetermined storage area on the RAM 27 or nonvolatile memory 28, thereby setting the communication rate. The CPU 25 of the IC card 20 transmits a response, and analyzes a received command according to the communication rate indicated by the communication rate setting information stored in the RAM 27 or nonvolatile memory 28.

When the acquired identification information does not match that held by itself, the IC card 20 ends the processing.

Upon completion of the setting of the communication rate, the IC card 20 generates a response to the selection command, and transmits the generated response to the terminal apparatus 10. Note that in this case, the IC card 20 transmits the response to the terminal apparatus 10 in a state in which the response can be analyzed at a standard communication rate. After the IC card 20 transmits the response to the selection command, it transmits a response, and analyzes a received command according to the communication rate set by the above processing.

Upon reception of the response to the selection command, the terminal apparatus 10 analyzes the response to recognize that selection of the IC card 20 is normally complete. After that, the terminal apparatus 10 transmits a command and analyzes a received response at the communication rate set in the IC card 20.

With the above processing, a communication path between the terminal apparatus 10 and IC card 20 is established. After that, the IC card 20 can execute various kinds of command processing based on commands transmitted from the terminal apparatus 10.

The terminal apparatus 10 transmits a command for controlling the IC card 20 to execute processing. Upon reception of the command, the IC card 20 analyzes the received command. The IC card executes command processing based on the analyzed command, and generates a response. The IC card 20 transmits the generated response to the terminal apparatus 10. That is, when the initial settings have been made, as described above, the terminal apparatus 10 functions in an active mode, and the IC card 20 functions in a passive mode.

Note that the terminal apparatus 10 and IC card 20 exchange commands and responses by exchanging frames in a predetermined format.

FIG. 3 shows an example of the processing of the IC card 20. Note that this embodiment will exemplify non-contact communications between the terminal apparatus 10 and IC card 20 in a block format specified by the ISO/IEC14443.

The terminal apparatus 10 and IC card 20 exchange commands and responses to make initial settings. Thus, a communication protocol is activated between the terminal apparatus 10 and IC card 20. As a result, the IC card 20 can execute various kinds of processing according to commands transmitted from the terminal apparatus 10.

The terminal apparatus 10 and IC card 20 exchange data of frames according to a communication format specified by the ISO/IEC14443. For example, the ISO/IEC14443 specifies a block transmission method such as I-block (information block), R-block (Receive ready block), S-Block (Supervisory block), and the like as frame formats.

The I-block, R-block, and S-block respectively assume different roles. The I-block is a format required to transmit information used in an application layer. Normal data read/write accesses use the I-block.

The R-block is a format required to transmit an acknowledge or negative acknowledge. The R-block includes some types, that is, an R-block (ACK) and R-block (NAC). The R-block (ACK) is used to request a next command. Also, the R-block (NAC) is used to request retransmission of a received command.

The S-block is a format required to exchange control information between the terminal apparatus 10 and IC card 20. The S-block is used as a processing time extension request or an IC card deactivation command (Deselect).

Figure 4:
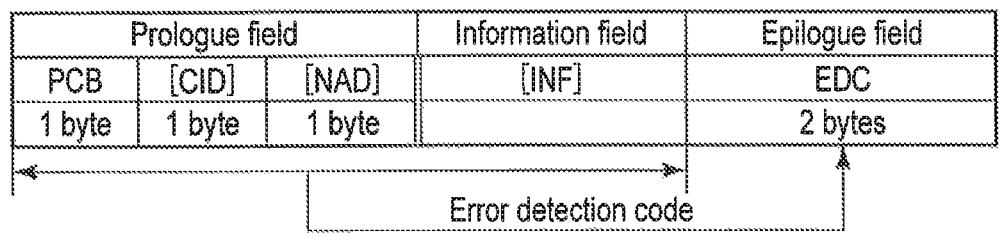
FIG. 4 is an exemplary view for explaining the IC card according to the embodiment.

FIG. 4 shows an example of a block format. A frame compliant with the block format specified by the ISO/IEC14443 has, for example, fields such as a prologue field, information field, and epilogue field. All of the I-block, R-block, and S-block are compliant with this block format shown in FIG. 4.

The prologue field has data such as a Protocol Control Byte (PCB), Card IDentifier (CID), and Node Address (NAD).

The PCB as the protocol control byte can transmit information required to control data transmission to the IC card 20. For example, the PCB has information indicating whether this frame is the I-block, R-block, or S-block.

The CID as the card identifier is data required to designate an IC card to be processed. The IC card 20 stores a unique CID in the ROM 26 or nonvolatile memory 28. The terminal apparatus 10 acquires the CID from the IC card 20 in the initial settings. The terminal apparatus 10 sets the CID of the IC card 20 to be processed in the CID of the prologue field.

Upon reception of a command, when the value of the CID in the prologue field matches the self CID value, the IC card 20 executes processing according to the received command.

The NAD as the node address is data required to establish a different logical connection.

The information field includes, for example, a data body of the command, application data, or Information (INF) such as status information. The IC card 20 executes various kinds of processing according to data stored in the information field. Note that the information field may be omitted.

The epilogue field includes, for example, an error detection code required to allow the IC card 20 to detect a communication error such as CRC. The error detection code is a value calculated based on the data in the epilogue field and information field. An apparatus on the passive mode can detect a communication error based on the data in the epilogue field and information field and the error detection code.

As shown in FIG. 3, after the communication with the IC card 20 is established, the terminal apparatus 10 generates a command required to control the IC card 20 to execute processing, and transmits the command (step S11). Note that the terminal apparatus 10 transmits the command of the I-block to the IC card 20.

Upon reception of the command, the IC card 20 analyzes the received command. The IC card executes command processing based on the analyzed command, and generates a response. The IC card 20 transmits the generated response to the terminal apparatus 10 (step S12). Note that the IC card 20 transmits the response of the I-block to the terminal apparatus 10.

When the initial settings are made between the terminal apparatus 10 and IC card 20 in response to the initial response request from the terminal apparatus 10, as described above, the terminal apparatus 10 functions in the active mode, and the IC card 20 functions in the passive mode.

The terminal apparatus 10 in the active mode generates a command (switching request command) which requests the IC card 20 in the passive mode to switch between the active mode and passive mode (step S13). The terminal apparatus 10 transmits the generated switching request command to the IC card 20 (step S14).

For example, the terminal apparatus 10 transmits the switching request command to the IC card 20 in response to an operation input. Alternatively, when the terminal apparatus 10 or IC card 20 judges that the active mode and passive mode are required to be switched in terms of processing in the IC card 20, the terminal apparatus 10 transmits the switching request command to the IC card 20. For example, when the terminal apparatus 10 transmits a pre-set command to the IC card 20, it transmits the switching request command to the IC card 20 next. The terminal apparatus 10 transmits the switching request command to the IC card 20 in the block format of any of the I-block, R-block, and S-block.

Figure 5:
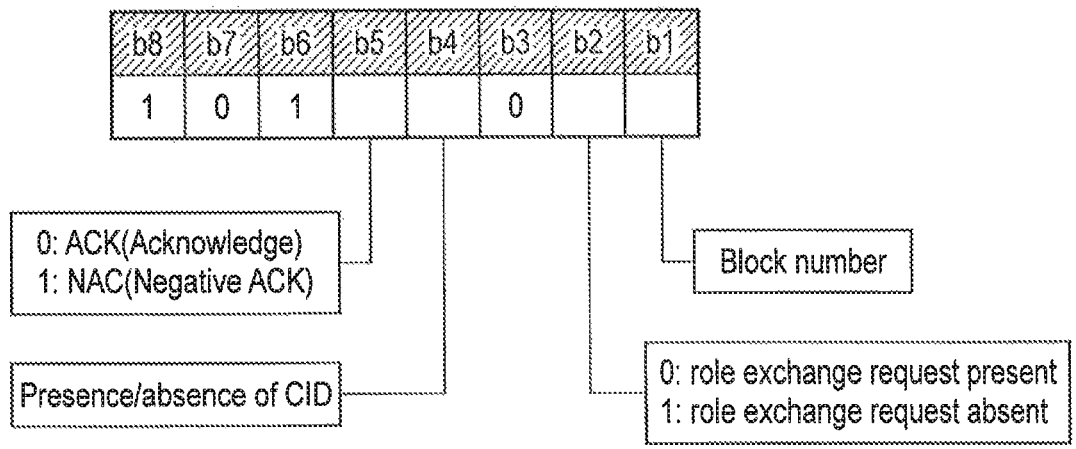
FIG. 5 is an exemplary view for explaining the IC card according to the embodiment.

FIG. 5 shows an example of the switching request command of the R-block. For example, the terminal apparatus 10 generates the switching request command in the R-block format. Note that the frame of the R-block includes a prologue field and epilogue field, and does not include any information field.

The PCB of the switching request command of the R-block is 1-byte data, and has first to eighth bits b1 to b8. The first bit b1 indicates a block number of this command.

The second bit b2 indicates the presence/absence of a role exchange request (switching request). That is, the second bit b2 indicates whether or not the frame including this PCB is the switching request command. In this example, when the second bit b2 is "0", it indicates that the frame including this PCB is the switching request command. On the other hand, when the second bit b2 is "1", it indicates that the frame including this PCB is not the switching request command. Note that assignments of "0" and "1" of the second bit b2 may be reversed.

The third bit b3 is a prescribed value. The fourth bit b4 indicates the presence/absence of the CID. The fifth bit b5 indicates whether the frame including this PCB is the R-block (ACK) or R-block (NAC). The sixth bit b6 is a prescribed value.

The seventh and eighth bits b7 and b8 indicate whether the frame including this PCB is the R-block, I-block, or S-block. For example, when the eighth bit b8 is "1" and the seventh bit b7 is "0", they indicate that the frame including this PCB is the R-block.

That is, when the terminal apparatus 10 respectively sets the eight bit b0, seventh bit b7, fifth bit b8, and second bit b2 of the PCB to be "1", "0", "0", and "0", it can generate the switching request command.

Upon reception of the command, the IC card 20 analyzes the PCB of the received command. Thus, the IC card 20 recognizes that the received command is the switching request command. That is, when the eighth bit b8 of the PCB is "1", the seventh bit b7 is "0", and the second bit b2 is "0", the IC card 20 recognizes that the received command is the switching request command.

When the IC card 20 in the passive mode receives the switching request command, it switches itself from the passive mode to the active mode (step S15). In this case, the IC card 20 can transmit a command to the terminal apparatus 10 or another IC card 30. Note that the IC card 20 transmits a command to the terminal apparatus 10 or another IC card 30 a predetermined time period T1 after switching of itself from the passive mode to the active mode.

For example, the IC card 20 generates a command of the I-block, and transmits it to the terminal apparatus 10 (step S16). The terminal apparatus 10 executes command processing according to the command received from the IC card 20. The terminal apparatus 10 transmits a response according to the result of the command processing to the IC card 20 (step S17).

Also, the IC card 20 can directly exchange commands and responses with another IC card 30. However, settings (initial settings) associated with communications are not set in the IC cards 20 and 30 at that time. For this reason, the IC card 20 makes initial settings required to establish a communication path with the IC card 30.

For this purpose, the IC card 20 generates an initial response request command. The IC card 20 generates the initial response request command which is the same as that generated by the terminal apparatus 10. The IC card 20 repetitively transmits the generated initial response request command to a communication range by the resonance module 24 (step S18).

When the IC card 30 enters the communication range of the resonance module 24 of the IC card 20, it receives the initial response request command transmitted from the IC card 20.

The IC card 30 analyzes the received initial response request command. Thus, the IC card 30 recognizes values of various parameters of the initial response request command. The IC card 30 executes processing based on the recognized values of the parameters. The IC card 30 generates a response (initial response) to the initial response request command according to the processing result.

The IC card 30 transmits the generated response (initial response) to the initial response request command to the IC card 20 (step S19).

When the IC card 20 receives the response (initial response) to the initial response request command from the IC card 30, it analyzes the received response. Thus, the IC card 20 recognizes that another IC card 30 exists within the self communication range.

Also, the IC card 20 generates a selection command including information indicating a communication rate to be set by the IC card 30, and identification information required to specify the IC card 30. The IC card 20 transmits the selection command to the IC card 30 (step S20).

Upon reception of the selection command, the IC card 30 analyzes the selection command. Thus, the IC card 30 recognizes the communication rate and identification information, which are included in the selection command and are designated by the IC card 20.

The IC card 30 compares the recognized identification information with that held by itself. When the two pieces of identification information match, the IC card 30 executes subsequent processing. In this case, the IC card 30 sets the communication rate designated by the selection command in itself. On the other hand, when the acquired identification information does not match that which is held by itself, the IC card 30 ends the processing.

When the communication rate setting is complete, the IC card 30 generates a response to the selection command, and transmits the generated response to the IC card 20 (step S21).

Upon reception of the response to the selection command, the IC card 20 analyzes the response, and recognizes that selection of the IC card 30 is normally complete. With the above processing, a communication path is established between the IC cards 30 and 20. After that, the IC cards 20 and 30 can transmit a command and analyze a response at the communication rate set in the IC card 30. That is, the IC card 30 can execute various kinds of command processing based on commands transmitted from the IC card 20.

For example, the IC card 20 generates a command of the I-block, and transmits it to the IC card 30 (step S22). The IC card 30 executes command processing in response to the command received from the IC card 20. The IC card 30 transmits a response according to the result of the command processing to the IC card 20 (step S23).

With the aforementioned processing, when the IC card 20 receives the switching request command from the terminal apparatus 10, it can switch the self mode from the passive mode to the active mode. Then, the IC card 20 can acquire, for example, information stored in a storage area on the terminal apparatus 10 or an apparatus connected to the terminal apparatus 10.

Furthermore, when the self mode is the active mode, the IC card 20 can directly exchange commands and responses with another IC card 30 within the communication range. In this manner, the IC card 20 can directly exchange data with the IC card 30 without the intervention of the terminal apparatus 10.

As a result, an IC card having higher convenience, a portable electronic apparatus, and a controlling method of an IC card can be provided.

Note that the IC card 30 generates electric power based on carrier waves output from the terminal apparatus 10 in the same manner as the IC card 20. Also, the IC card 30 may generate electric power based on carrier waves output from the IC card 20. Furthermore, the IC card 30 may be driven by a battery held by itself.

Next, an example of a switching request to the IC card 20 using a switching request command of the I-block will be described below.

Figure 6:
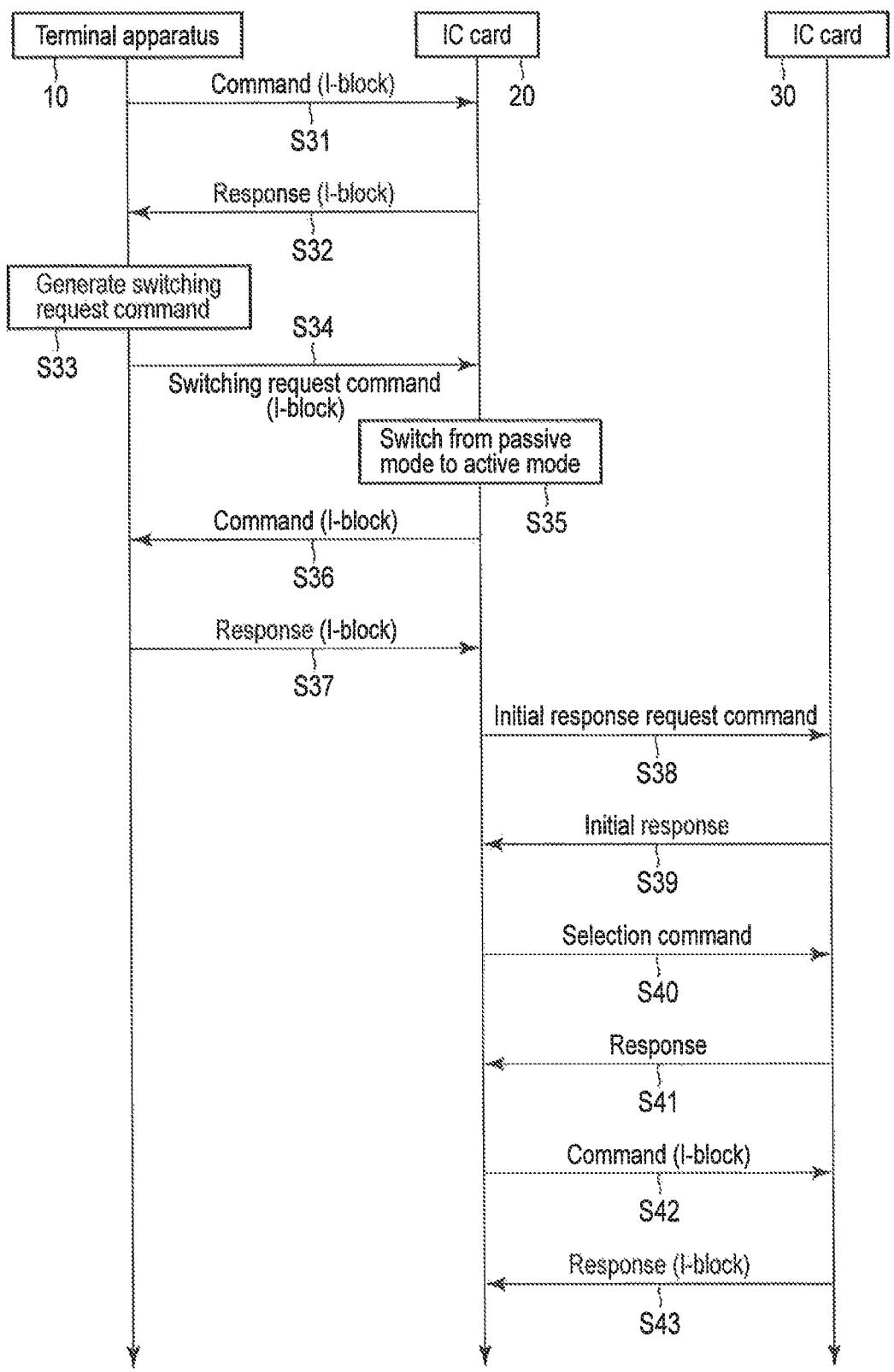
FIG. 6 is an exemplary view for explaining the IC card according to the embodiment.

FIG. 6 shows another example of the processing of the IC card 20. After the communication with the IC card 20 is established, the terminal apparatus 10 generates a command required to control the IC card 20 to execute processing, and transmits that command to the IC card 20 (step S31). Note that the terminal apparatus 10 transmits the command of the I-block to the IC card 20.

Upon reception of the command, the IC card 20 analyzes the received command. The IC card 20 executes command processing based on the analyzed command, and generates a response. The IC card 20 transmits the generated response to the terminal apparatus 10 (step S32). Note that the IC card 20 transmits the response of the I-block to the terminal apparatus 10.

As described above, when the initial settings are made between the terminal apparatus 10 and IC card 20 in accordance with the initial response request from the terminal apparatus 10, the terminal apparatus 10 functions in the active mode, and the IC card functions in the passive mode.

The terminal apparatus 10 in the active mode generates a command which requests the IC card 20 in the passive mode to switch between the active mode and the passive mode (switching request command) in the I-block format (step S33). The terminal apparatus 10 transmits the generated switching request command to the IC card 20 (step S34).

Figure 7:
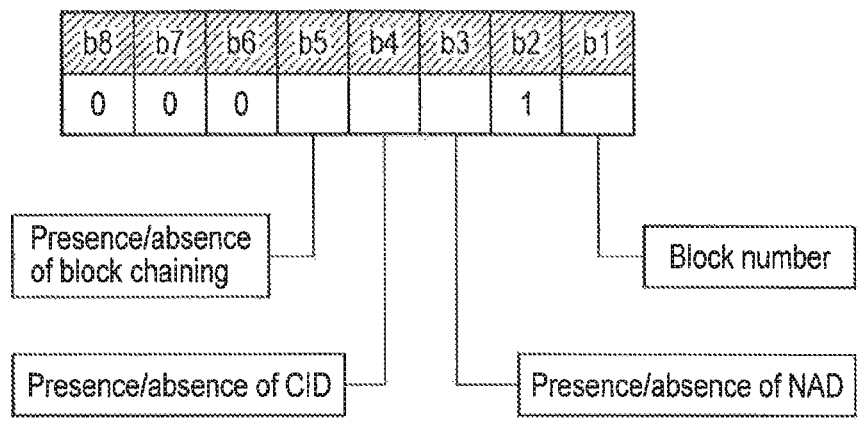
FIG. 7 is an exemplary view for explaining the IC card according to the embodiment.

FIG. 7 shows an example of the switching request command of the I-block. Note that a frame of the I-block includes a prologue field, information field, and epilogue field.

The PCB of the switching request command of the I-block is 1-byte data, and has first to eighth bits b1 to b8. The first bit b1 indicates a block number of this command.

The second bit b2 is a prescribed value. The third bit b3 indicates the presence/absence of an NAD. The fourth bit b4 indicates the presence/absence of the CID. The fifth bit b5 indicates whether or not this command is a chain command (coupled command). The sixth bit b6 is a prescribed value.

The seventh and eighth bits b7 and b8 indicate whether the frame including this PCB is the I-block, R-block, or S-block. For example, when the eighth bit b8 is "0" and the seventh bit b7 is "0", they indicate that the frame including this PCB is the I-block.

The switching request command of the I-block has a main body of the switching request command in the information field. That is, the switching request command of the I-block has data indicating the presence/absence of a role exchange request (switching request) in the information field.

When the IC card 20 receives the command, it analyzes the PCB of the received command. Furthermore, when the IC card 20 recognizes that the block format of the command is the I-block, it executes command processing based on data in the information field. As a result, the IC card 20 executes the switching request command stored in the information field.

When the IC card 20 in the passive mode executes the switching request command, it switches itself from the passive mode to the active mode (step S35). In this case, the IC card 20 can transmit a command to the terminal apparatus 10 or another IC card 30. Note that the IC card 20 transmits a command to the terminal apparatus 10 or another IC card 30 the predetermined time period T1 after it switches itself from the passive mode to the active mode.

For example, the IC card 20 generates a command of the I-block, and transmits it to the terminal apparatus 10 (step S36). The terminal apparatus 10 executes command processing according to the command received from the IC card 20. The terminal apparatus 10 transmits a response according to the result of the command processing to the IC card 20 (step S37).

Also, the IC card 20 can directly exchange commands and responses with another IC card 30. For this purpose, the IC card 20 generates an initial response request command. The IC card 20 generates the initial response request command which is the same as that generated by the terminal apparatus 10. The IC card 20 repetitively transmits the generated initial response request command to a communication range by the resonance module 24 (step S38).

When the IC card 30 enters the communication range of the resonance module 24 of the IC card 20, it receives the initial response request command transmitted from the IC card 20.

The IC card 30 analyzes the received initial response request command. Thus, the IC card 30 recognizes values of various parameters of the initial response request command. The IC card 30 executes processing based on the recognized values of the parameters. The IC card 30 generates a response (initial response) to the initial response request command according to the processing result.

The IC card 30 transmits the generated response (initial response) to the initial response request command to the IC card 20 (step S39).

When the IC card 20 receives the response (initial response) to the initial response request command from the IC card 30, it analyzes the received response. Thus, the IC card 20 recognizes that another IC card 30 exists within the self communication range.

Also, the IC card 20 generates a selection command including information indicating a communication rate to be set by the IC card 30, and identification information required to specify the IC card 30. The IC card 20 transmits the selection command to the IC card 30 (step S40).

Upon reception of the selection command, the IC card 30 analyzes the selection command. Thus, the IC card 30 recognizes the communication rate and identification information, which are included in the selection command and are designated by the IC card 20.

The IC card 30 compares the recognized identification information with that held by itself. When the two pieces of identification information match, the IC card 30 executes subsequent processing. In this case, the IC card 30 sets the communication rate designated by the selection command in itself. On the other hand, when the acquired identification information does not match that which is held by itself, the IC card 30 ends the processing.

When the communication rate setting is complete, the IC card 30 generates a response to the selection command, and transmits the generated response to the IC card 20 (step S41).

Upon reception of the response to the selection command, the IC card 20 analyzes the response, and recognizes that selection of the IC card 30 is normally complete. With the above processing, a communication path is established between the IC cards 30 and 20. After that, the IC cards 20 and 30 can transmit a command and analyze a response at the communication rate set in the IC card 30. That is, the IC card 30 can execute various kinds of command processing based on commands transmitted from the IC card 20.

For example, the IC card 20 generates a command of the I-block, and transmits it to the IC card 30 (step S42). The IC card 30 executes command processing in response to the command received from the IC card 20. The IC card 30 transmits a response according to the result of the command processing to the IC card 20 (step S43).

With the aforementioned processing, when the IC card 20 receives the switching request command from the terminal apparatus 10, it can switch the self mode from the passive mode to the active mode. Then, the IC card 20 can acquire, for example, information stored in a storage area on the terminal apparatus 10 or an apparatus connected to the terminal apparatus 10.

Furthermore, when the self mode is the active mode, the IC card 20 can directly exchange commands and responses with another IC card 30 within the communication range. In this manner, the IC card 20 can directly exchange data with the IC card 30 without the intervention of the terminal apparatus 10.

As a result, an IC card having higher convenience, a portable electronic apparatus, and a controlling method of an IC card can be provided.

Next, an example of a switching request to the IC card 20 using a switching request command of the S-block will be described below.

Figure 8:
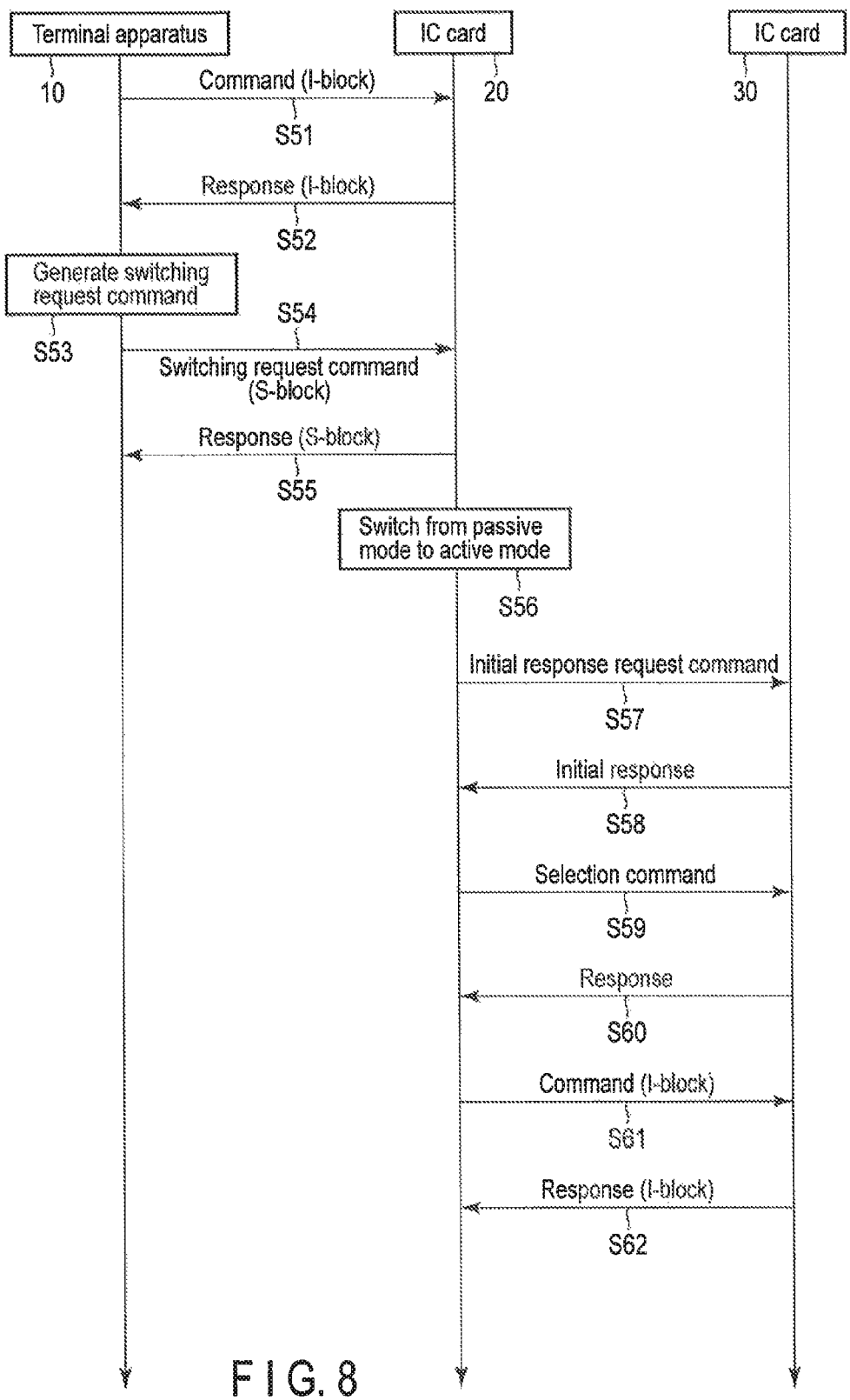
FIG. 8 is an exemplary view for explaining the IC card according to the embodiment.

FIG. 8 shows another example of the processing of the IC card 20. After the communication with the IC card 20 is established, the terminal apparatus 10 generates a command required to control the IC card 20 to execute processing, and transmits that command to the IC card 20 (step S51). Note that the terminal apparatus 10 transmits the command of the I-block to the IC card 20.

Upon reception of the command, the IC card 20 analyzes the received command. The IC card 20 executes command processing based on the analyzed command, and generates a response. The IC card 20 transmits the generated response to the terminal apparatus 10 (step S52). Note that the IC card 20 transmits the response of the I-block to the terminal apparatus 10.

When the initial settings are made between the terminal apparatus 10 and IC card 20 in accordance with the initial response request from the terminal apparatus 10, the terminal apparatus 10 functions in the active mode, and the IC card 20 functions in the passive mode.

The terminal apparatus 10 in the active mode generates a command which requests the IC card 20 in the passive mode to switch between the active mode and the passive mode (switching request command) in the S-block format (step S53). The terminal apparatus 10 transmits the generated switching request command to the IC card 20 (step S54).

Figure 9:
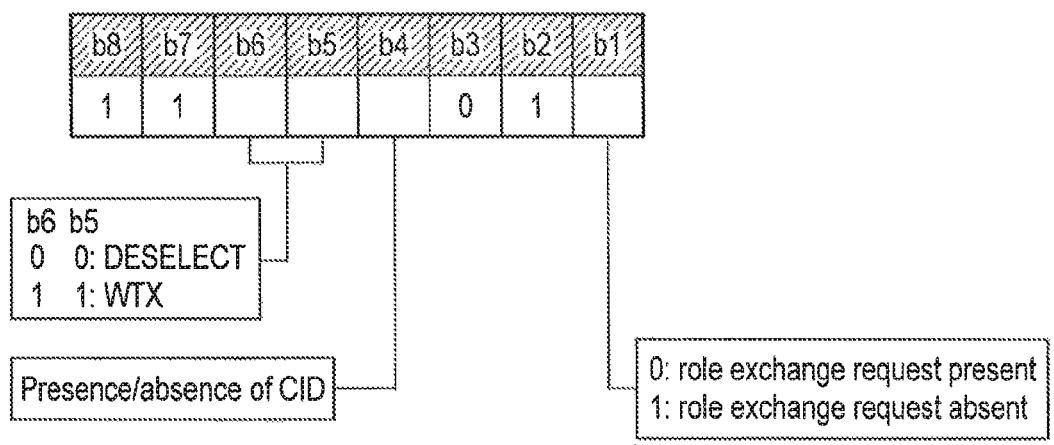
FIG. 9 is an exemplary view for explaining the IC card according to the embodiment.

FIG. 9 shows an example of the switching request command of the S-block. Note that a frame of the I-block includes a prologue field, information field, and epilogue field.

The PCB of the switching request command of the S-block is 1-byte data, and has first to eighth bits b1 to b8.

The first bit b1 indicates the presence/absence of a role exchange request (switching request). That is, the first bit b1 indicates whether or not the frame including this PCB is a switching request command. In this example, when the first bit b1 is "1", it indicates that the frame including this PCB is the switching request command. On the other hand, when the first bit b1 is "0", it indicates that the frame including this PCB is not the switching request command. Note that assignments of "0" and "1" of the first bit b1 may be reversed.

The second and third bits b2 and b3 are prescribed values. The fourth bit b4 indicates the presence/absence of the CID. The fifth and sixth bits b5 and b6 indicate whether this command is a WTC (Waiting Time extension) command or a command required to deactivate the IC card 20 (Deselect).

The seventh and eighth bits b7 and b8 indicate whether the frame including this PCB is the I-block, R-block, or S-block. For example, when the eighth bit b8 is "1" and the seventh bit b7 is "1", they indicate that the frame including this PCB is the S-block.

For example, the terminal apparatus 10 transmits the switching request command to the IC card 20 in response to an operation input. Alternatively, when the terminal apparatus 10 or IC card 20 judges that the active mode and passive mode are required to be switched in terms of processing in the IC card 20, the terminal apparatus 10 transmits the switching request command to the IC card 20. For example, when the terminal apparatus 10 transmits a pre-set command to the IC card 20, it transmits the switching request command to the IC card 20 next. Furthermore, when the terminal apparatus 10 instructs the IC card 20 to switch carrier waves, it transmits the switching request command using the S-block.

That is, when the terminal apparatus 10 instructs the IC card 20 to switch between the passive mode and active mode, and to switch carrier waves, it sets the eighth bit b8 of the PCB to be "1" and the seventh bit b7 to be "1", and also sets the first bit b1 to be "1". The terminal apparatus 10 transmits the switching request command, which is set in this way, to the IC card 20.

When the IC card 20 receives the command, it analyzes the PCB of the received command. Then, the IC card 20 recognizes that the received command is the switching request command. That is, when the eighth bit b8 of the PCB is "1", the seventh bit b7 is "1", and the first bit b1 is "1", the IC card 20 recognizes that the received command is the switching request command.

The IC card 20 generates a response of the S-block according to the received switching request command. The IC card 20 returns the generated response to the terminal apparatus 10 (step S55). When the terminal apparatus 10 receives the response of the S-block to the transmitted switching request command, it stops outputting of carrier waves.

When the IC card 20 in the passive mode receives the switching request command, it switches itself from the passive mode to the active mode (step S56). In this case, the IC card 20 can transmit a command to the terminal apparatus 10 or another IC card 30. That is, when the eighth bit b8 of the PCB is "1", the seventh bit b7 is "1", and the first bit b1 is "1", the IC card 20 recognizes that the received command is the switching request command. Note that the IC card 20 transmits a command to the terminal apparatus 10 or another IC card 30 the predetermined time period T1 after it switches itself from the passive mode to the active mode.

Furthermore, when the received command is the switch request command, and has the S-block format, the IC card 20 outputs carrier waves by the resonance module 24 using electric power in the battery 31a. Thus, the IC card 20 can supply carrier waves to another IC card 30. In this case, the IC card 20 can transmit a command to another IC card 30.

The IC card 20 generates an initial response request command so as to directly exchange commands and responses with another IC card 30. The IC card 20 generates the initial response request command which is the same as that generated by the terminal apparatus 10. The IC card 20 repetitively transmits the generated initial response request command to a communication range by the resonance module 24 (step S57).

When the IC card 30 enters the communication range of the resonance module 24 of the IC card 20, it generates electric power based on the carrier waves output from the IC card 20 and is activated. Also, the IC card 30 receives the initial response request command transmitted from the IC card 20.

The IC card 30 analyzes the received initial response request command. Thus, the IC card 30 recognizes values of various parameters of the initial response request command. The IC card 30 executes processing based on the recognized values of the parameters. The IC card 30 generates a response (initial response) to the initial response request command according to the processing result.

The IC card 30 transmits the generated response (initial response) to the initial response request command to the IC card 20 (step S58).

When the IC card 20 receives the response (initial response) to the initial response request command from the IC card 30, it analyzes the received response. Thus, the IC card 20 recognizes that another IC card 30 exists within the self communication range.

Also, the IC card 20 generates a selection command including information indicating a communication rate to be set by the IC card 30, and identification information required to specify the IC card 30. The IC card 20 transmits the selection command to the IC card 30 (step S59).

Upon reception of the selection command, the IC card 30 analyzes the selection command. Thus, the IC card 30 recognizes the communication rate and identification information, which are included in the selection command and are designated by the IC card 20.

The IC card 30 compares the recognized identification information with that held by itself. When the two pieces of identification information match, the IC card 30 executes subsequent processing. In this case, the IC card 30 sets the communication rate designated by the selection command in itself. On the other hand, when the acquired identification information does not match that which is held by itself, the IC card 30 ends the processing.

When the communication rate setting is complete, the IC card 30 generates a response to the selection command, and transmits the generated response to the IC card 20 (step S60).

Upon reception of the response to the selection command, the IC card 20 analyzes the response, and recognizes that selection of the IC card 30 is normally complete. With the above processing, a communication path is established between the IC cards 30 and 20. After that, the IC cards 20 and 30 can transmit a command and analyze a response at the communication rate set in the IC card 30. That is, the IC card 30 can execute various kinds of command processing based on commands transmitted from the IC card 20.

For example, the IC card 20 generates a command of the I-block, and transmits it to the IC card 30 (step S61). The IC card 30 executes command processing in response to the command received from the IC card 20. The IC card 30 transmits a response according to the result of the command processing to the IC card 20 (step S62).

With the aforementioned processing, when the IC card 20 receives the switching request command from the terminal apparatus 10, it can switch the self mode from the passive mode to the active mode. Furthermore, when the self mode is the active mode, the IC card 20 can supply carrier waves to another IC card 30 within the communication range. Then, the IC card 20 can directly exchange commands and responses with another IC card 30. In this manner, the IC card 20 can directly exchange data with the IC card 30 without the intervention of the terminal apparatus 10.

As a result, an IC card having higher convenience, a portable electronic apparatus, and a controlling method of an IC card can be provided.

Figure 10:
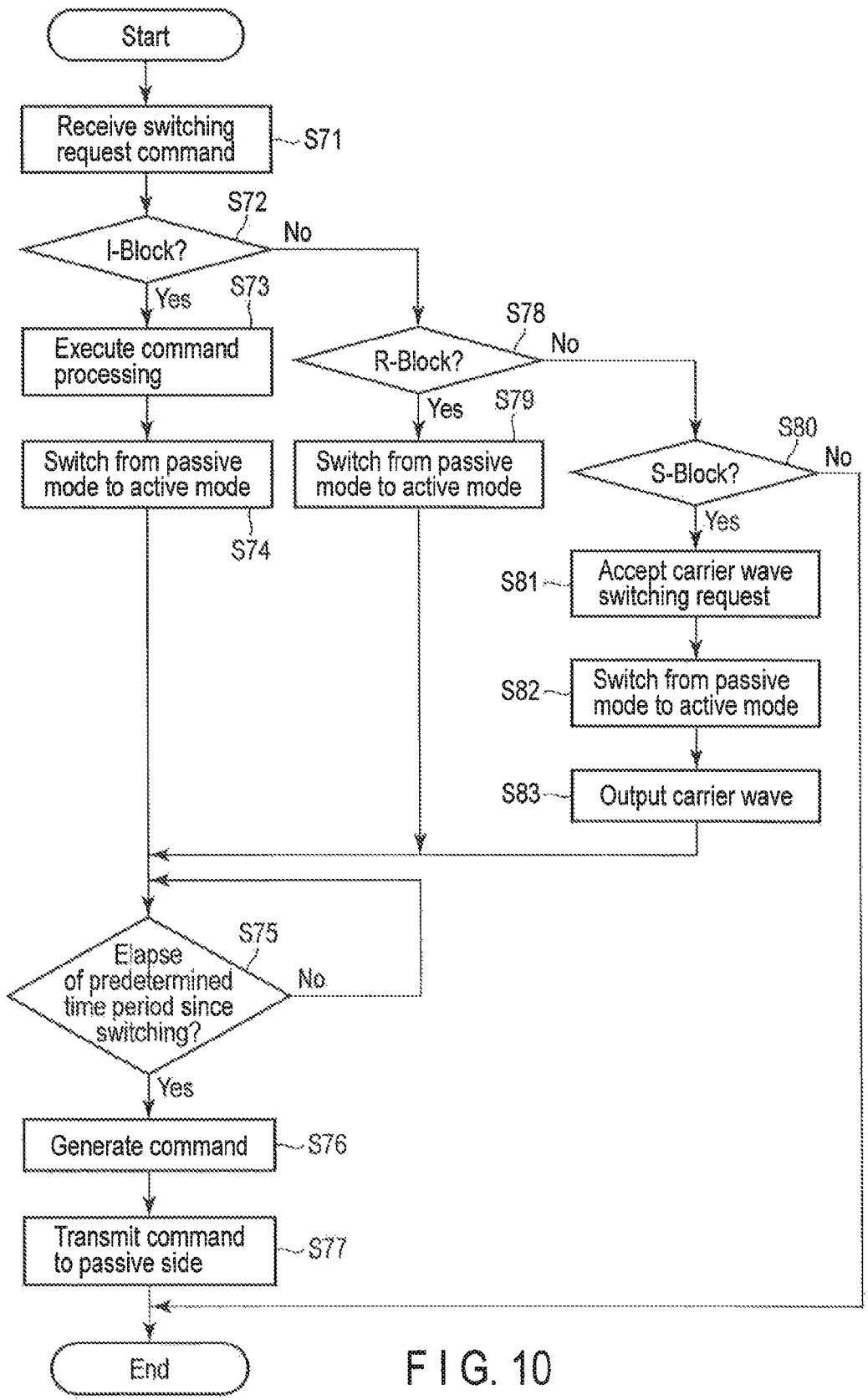
FIG. 10 is an exemplary view for explaining the IC card according to the embodiment.

FIG. 10 shows an example of the processing of the IC card 20.

The IC card 20 receives a switching request command from the terminal apparatus 10 (step S71). The IC card 20 judges whether or not the block format of the received switching request command is the I-block (step S72).

If the block format of the received switching request command is the I-block, the IC card 20 executes command processing based on data in the informant field of the received command (step S73). As a result, the IC card 20 switches the self mode from the passive mode to the active mode (step S74).

The IC card 20 determines whether or not the predetermined time period T1 has elapsed since it switches the self mode from the passive mode to the active mode (step S75). If the predetermined time period has elapsed, the IC card 20 generates a command to be transmitted to an apparatus in the passive mode (step S76) Furthermore, the IC card 20 transmits the generated command to the apparatus in the passive mode (step S77).

On the other hand, if the IC card 20 determines in step S72 that the block format is not the I-block, it judges whether or not the block format of the received switching request command is the R-block (step S78). If the block format of the received switching request command is the R-block, the IC card 20 switches the self mode from the passive mode to the active mode (step S79), and the process then advances to step S75.

On the other hand, if the IC card 20 determines in step S78 that the block format is not the R-block, it judges whether or not the block format of the received switching request command is the S-block (step S80). If the block format of the received switching request command is the S-block, the IC card 20 accepts a carrier wave switching request (step S81). Furthermore, the IC card 20 switches the self mode from the passive mode to the active mode (step S82). The IC card 20 outputs carrier waves (step S83), and the process then advances to step S75.

That is, when the received command is the switching request command and has the S-block format, the IC card 20 executes processing for outputting carrier waves by the resonance module 24 using electric power in the battery 31a, and outputting a command.

If the IC card 20 judges in step S80 that the block format is not the S-block, it judges that the received command is abnormal, and ends the processing.

With the above processing, the IC card 20 can switch the self mode from the passive mode to the active mode by various different methods according to the block format of the switching request command from the terminal apparatus 10.

That is, when the block format of the received switching request command is the I-block, the IC card 20 executes command processing based on data in the information field of the I-block, thereby switching the self mode from the passive mode to the active mode.

Also, when the block format of the received switching request command is the R-block, the IC card 20 can more easily switch the self mode from the passive mode to the active mode.

Furthermore, when the block format of the received switching request command is the SI-block, the IC card 20 can switch the self mode form the passive mode to the active mode, and can also start outputting of carrier waves.

In this way, the IC card 20 can communicate with the terminal apparatus 10 or another IC card 30 more appropriately. As a result, an IC card having higher convenience, a portable electronic apparatus, and a controlling method of an IC card can be provided.

Functions described in the above embodiment may be constituted not only with use of hardware but also with use of software, for example, by making a computer read a program which describes the functions. Alternatively, the functions each may be constituted by appropriately selecting either software or hardware.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An IC card which makes a non-contact communication with an external apparatus, comprising:
   a reception module configured to receive a first command transmitted from the external apparatus;
   a determination module configured to determine whether or not the first command is a switching request command which requests to switch the IC card from a passive mode to an active mode;
   a command generation module configured to generate a second command which controls an other IC card to execute processing when the first command is the switching request command; and
   a command transmission module configured to transmit the second command to the other IC card,
   wherein
   the command generation module generates an initial setting command required to establish a communication path with the other IC card when the first command is the switching request command, and
   the command generation module generates a second command which controls the other IC card to execute processing when the communication path is established with the other IC card.

2. The IC card of claim 1, further comprising:
   a battery; and
   a carrier wave output module configured to output carrier waves using electric power of the battery,
   wherein the determination module determines based on the switching request command whether or not switching of carrier waves is requested, and
   the carrier wave output module outputs the carrier waves to the other IC card using electric power of the battery when switching of the carrier waves is requested.

3. The IC card of claim 1, further comprising:
   an IC module that includes the reception module, the determination module, the command generation module, and the command transmission module; and
   a main body in which the IC module is arranged.

4. The IC card of claim 1, wherein
   the command generation module receives an initial response from the other IC card after generating the initial setting command, and before generating the second command, and
   the command generation module receives a second response after generating the second command and prior to sending a third command in the active mode.

5. A portable electronic apparatus which makes a non-contact communication with an external apparatus, comprising:
   a reception module configured to receive a first command transmitted from the external apparatus;
   a determination module configured to determine whether or not the first command is a switching request command which requests to switch the portable electronic apparatus from a passive mode to an active mode;
   a command generation module configured to generate a second command which controls other portable electronic apparatus to execute processing when the first command is the switching request command; and
   a command transmission module configured to transmit the second command to the other portable electronic apparatus,
   wherein
   the command generation module generates an initial setting command required to establish a communication path with the other IC card when the first command is the switching request command, and
   the command generation module generates a second command which controls the other IC card to execute processing when the communication path is established with the other IC card.

6. The portable electronic apparatus of claim 5, wherein
   the command generation module receives an initial response from the other IC card after generating the initial setting command, and before generating the second command, and
   the command generation module receives a second response after generating the second command and prior to sending a third command in the active mode.

7. A controlling method of an IC card, which makes a non-contact communication with an external apparatus, the controlling method comprising:
   receiving a first command transmitted from the external apparatus;
   determining whether or not the first command is a switching request command which requests to switch the IC card from a passive mode to an active mode;
   generating an initial setting command required to establish a communication path with the other IC card when the first command is the switching request command;
   generating a second command which controls the other IC card to execute processing when the communication path is established with the other IC card; and
   transmitting the second command to the other IC card.

8. The controlling method of an IC card of claim 7, further comprising:
   receiving an initial response from the other IC card after generating the initial setting command, and before generating the second command, and receiving a second response after transmitting the second command and prior to transmitting a third command in the active mode.

\* \* \* \* \*